(12) United States Patent
Kyono

(10) Patent No.: US 7,629,781 B2
(45) Date of Patent: Dec. 8, 2009

(54) MULTI-OUTPUT SWITCHING POWER SUPPLY

(75) Inventor: Yoichi Kyono, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 298 days.

(21) Appl. No.: 11/610,626

(22) Filed: Dec. 14, 2006

(65) Prior Publication Data

US 2007/0138870 A1 Jun. 21, 2007

(30) Foreign Application Priority Data

Dec. 21, 2005 (JP) ............................. 2005-368183

(51) Int. Cl.
*G05F 1/577* (2006.01)
(52) U.S. Cl. .......................... 323/267; 363/16; 363/126
(58) Field of Classification Search ................ 323/267; 363/16, 67, 21.02, 69, 70, 84, 126; 307/16, 307/17

See application file for complete search history.

(56) References Cited

U.S. PATENT DOCUMENTS

| | | | | |
|---|---|---|---|---|
| 4,695,934 | A * | 9/1987 | Steigerwald et al. | 363/17 |
| 5,991,167 | A * | 11/1999 | Van Lerberghe | 363/16 |
| 6,072,709 | A * | 6/2000 | Raets | 363/93 |
| 6,501,193 | B1 * | 12/2002 | Krugly | 307/31 |
| 6,721,191 | B2 * | 4/2004 | Duerbaum et al. | 363/16 |
| 2006/0098464 | A1 | 5/2006 | Osaka et al. | |

2006/0291117 A1 12/2006 Kyono

FOREIGN PATENT DOCUMENTS

JP 2003-259644 9/2003

OTHER PUBLICATIONS

U.S. Appl. No. 11/621,284, filed Jan. 9, 2007, Kyono.
U.S. Appl. No. 12/089,054, filed Apr. 3, 2008, Kyono.
U.S. Appl. No. 12/442,824, filed Mar. 25, 2009, Kyono.

* cited by examiner

*Primary Examiner*—Adolf Berhane
*Assistant Examiner*—Harry Behm
(74) *Attorney, Agent, or Firm*—Oblon, Spivak, McClelland, Maier & Neustadt, L.L.P.

(57) ABSTRACT

A multi-output switching power supply of the present invention includes: a series resonant circuit which is connected in parallel with a first switching element or a second switching element, and includes a current resonance capacitor, a resonant reactor and a primary winding of a transformer, which are connected in series; a first rectifying and smoothing circuit which rectifies and smoothes a voltage generated in a first secondary winding of the transformer, and outputs a first output; a second rectifying and smoothing circuit which has a first diode for rectifying a voltage generated in a second secondary winding of the transformer, a reactor having energy stored therein by the voltage rectified by the first diode and a second diode for regenerating the energy into an output, and which rectifies a current flowing through the reactor and outputs a second output; and a control circuit which alternately turns on and off the first and second switching elements based on the first output.

6 Claims, 12 Drawing Sheets

MULTI-OUTPUT SWITCHING POWER SUPPLY

BACKGROUND OF THE INVENTION

1. Field of the Invention

The present invention relates to a multi-output switching power supply having a plurality of outputs.

2. Description of the Related Art

FIG. 1 is a circuit diagram showing a configuration of a conventional resonance-type multi-output switching power supply. In this multi-output switching power supply, a primary side of a transformer T1 is provided with: a full-wave rectifying circuit 2 which rectifies an AC voltage from a commercial power source 1; a smoothing capacitor C3 which is connected between output terminals of the full-wave rectifying circuit 2, and smoothes an output of the full-wave rectifying circuit 2; a first switching element Q1 and a second switching element Q2 which are made of, for example, MOS-FETs and are connected in series between both ends of the smoothing capacitor C3, and to which a voltage between the both ends of the smoothing capacitor C3 is applied as a DC input voltage Vin; a control circuit 10 which controls the turning on and off of the first and second switching elements Q1 and Q2; a voltage resonance capacitor Crv which is connected in parallel with the second switching element Q2; and a series resonant circuit which is connected to both ends of the voltage resonance capacitor Crv.

The series resonant circuit is formed by connecting a primary winding P1 (a winding number N1) of the transformer T1, a reactor Lr, and a current resonance capacitor Cri in series. Note that the reactor Lr is formed of, for example, a leakage inductance between primary and secondary sides of the transformer T1.

Moreover, the secondary side of the transformer T1 is provided with: a first rectifying and smoothing circuit connected to a first secondary winding S1 (a winding number N2) which is wound so as to generate a voltage having a phase opposite to that of a voltage of the primary winding P1 of the transformer T1; and a second rectifying and smoothing circuit connected to a second secondary winding S2 (a winding number N3) which is wound so as to generate a voltage having a phase opposite to that of the voltage of the primary winding P1 of the transformer T1.

The first rectifying and smoothing circuit includes a diode D1 and a smoothing capacitor C1. The first rectifying and smoothing circuit rectifies and smoothes the voltage induced by the first secondary winding S1 of the transformer T1, and outputs the rectified and smoothed voltage, as a first output voltage Vo1, from a first output terminal. The second rectifying and smoothing circuit includes a diode D2 and a smoothing capacitor C2. The second rectifying and smoothing circuit rectifies and smoothes the voltage induced by the second secondary winding S2 of the transformer T1, and outputs the rectified and smoothed voltage, as a second output voltage Vo2, from a second output terminal.

Moreover, the multi-output switching power supply described above includes a feedback circuit 5 for feeding back a signal corresponding to the voltage generated in the secondary side of the transformer T1 to the primary side. An input side of the feedback circuit 5 is connected to the first output terminal. This feedback circuit 5 compares a voltage between both ends of the smoothing capacitor C1 with a predetermined reference voltage, and feeds back an error voltage, as a voltage error signal, to the control circuit 10 on the primary side.

The control circuit 10 performs a PWM control so as to set the first output voltage Vo1 constant by alternately turning on and off the first and second switching elements Q1 and Q2 based on the voltage error signal fed back from the feedback circuit 5. In this case, as a control signal, such a voltage as to allow a dead time of about several hundred nS is applied to each of gates of the first and second switching elements Q1 and Q2. Thus, the first and second switching elements Q1 and Q2 are alternately turned on and off without allowing the respective on periods thereof to overlap with each other.

Next, with reference to a waveform diagram shown in FIG. 2, operations of the conventional multi-output switching power supply thus configured will be described.

In FIG. 2, $V_{Q2ds}$ is a voltage between a drain and a source of the second switching element Q2. $I_{Q1}$ is a current flowing through a drain of the first switching element Q1. $I_{Q2}$ is a current flowing through the drain of the second switching element Q2. $I_{cri}$ is a current flowing through the current resonance capacitor Cri. $V_{cri}$ is a voltage between both ends of the current resonance capacitor Cri. $I_{D1}$ is a current flowing through the diode D1, and $I_{D2}$ is a current flowing through the diode D2.

The control circuit 10 controls the first output voltage Vo1 by receiving the voltage error signal fed back to the primary side through the feedback circuit 5 from the first rectifying and smoothing circuit, and by thus performing the PWM control of the first switching element Q1. In this case, the first and second switching elements Q1 and Q2 are alternately turned on and off with the dead time of about several hundred nS according to the control signal from the control circuit 10, as described above.

First, in the on period (for example, time t1 to t2) of the first switching element Q1, energy is stored in the current resonance capacitor Cri through an exciting inductance of the primary winding P1 of the transformer T1 and the reactor Lr (the leakage inductance between the primary and secondary sides of the transformer T1).

Next, in the on period (for example, time t2 to t4) of the second switching element Q2, the energy stored in the current resonance capacitor Cri allows the reactor Lr and the current resonance capacitor Cri to generate a resonance current, and the energy is transmitted to the secondary side. Moreover, exciting energy of the exciting inductance of the primary winding P1 is reset.

To be more specific, in the on period of the second switching element Q2, a voltage obtained by dividing the voltage $V_{cri}$ between the both ends of the current resonance capacitor Cri by the exciting inductance of the primary winding P1 and the reactor Lr is applied to the primary winding P1. Then, when the voltage applied to the primary winding P1 reaches (Vo1+Vf)×N1/N2, clamping is performed. Accordingly, the resonance current generated by the current resonance capacitor Cri and the reactor Lr flows, and the energy is transmitted to the secondary side. Thus, the current ID1 flows through the diode D1. When the voltage applied to the primary winding P1 is less than (Vo1+Vf)×N1/N2, no energy is transmitted to the secondary side of the transformer T1. Moreover, a resonance operation is performed only on the primary side by the exciting inductance of the primary winding P1 of the transformer T1, the reactor Lr and the current resonance capacitor Cri.

When an on-duty of the first switching element Q1 is Don, the voltage of the current resonance capacitor Cri is subjected to a resonance operation around about Vin×Don. Thus, the output voltage Vo1 is set to about Vin×Don×(Lp/Lri)×(Ns/Np). With respect to a change in a load, only amplitude of the voltage of the current resonance capacitor Cri is changed, and the duty is hardly changed. The duty is changed only with respect to a change in an input voltage.

Moreover, the first and second secondary windings S1 and S2 are connected to each other with the same polarity. Thus, in the on period of the second switching element Q2, while energy obtained from the first secondary winding S1 is outputted as the first output voltage Vo1, energy obtained from the second secondary winding S2 is also outputted as the second output voltage Vo2. The second output voltage Vo2 is set approximately to Vo1×N3/N2.

As described above, the second output voltage Vo2 is set to a voltage obtained by multiplying the first output voltage by a ratio of the winding number of the first secondary winding S1 to the winding number of the second secondary winding S2. Thus, if the first secondary winding S1 has a reduced number of turns, it becomes more difficult to obtain a required voltage.

FIG. 3 is a circuit diagram showing a configuration of another conventional multi-output switching power supply. This multi-output switching power supply is provided with a regulator 12 such as a dropper and a step-down chopper, in place of the second rectifying and smoothing circuit shown in FIG. 1. This regulator 12 is used to generate a second output voltage Vo2 from the first output voltage Vo1 for the purpose of stabilizing outputs. The multi-output switching power supply described above can solve a problem of cross regulation of two outputs. However, losses caused by the regulator 12 are increased, and costs and a mounting area are increased by adding components such as a switching element, choke coil and a control IC. Furthermore, occurrence of noise due to a switching regulator, such as the step-down chopper, is unavoidable.

Moreover, as a multi-output switching power supply, Japanese Patent Laid-Open Official Gazette No. 2003-259644 discloses a switching converter circuit which stabilizes two kinds of voltages by use of a single converter. This switching converter circuit includes an active snubber formed of a second switching element, stabilizes a first output by controlling the turning on and off of a first switching element, and stabilizes a second output by controlling the turning on and off of the second switching element while the first switching element is off. The switching converter circuit described above can stabilize the two kinds of outputs by use of the single converter. However, a secondary winding for obtaining the first output and a secondary winding for obtaining the second output are required to have polarities opposite to each other. Thus, two secondary windings are required.

As described above, the second output voltage Vo2 is determined by the ratio of the winding number of the first secondary winding S1 to the winding number of the second secondary winding S2. Thus, a required voltage may not be obtained. In the configuration including the regulator on the secondary side for solving the above problem, losses caused by the regulator are increased, and costs and the mounting area are increased by adding components. Furthermore, there is a problem that noise is caused by the regulator. Moreover, in the switching converter circuit disclosed in Japanese Patent Laid-Open Official Gazette No. 2003-259644, a plurality of secondary windings of a transformer are required. Thus, there is a problem that the configuration becomes complicated.

SUMMARY OF THE INVENTION

It is an object of the present invention to provide a multi-output switching power supply which can stabilize a plurality of outputs even if there is a load change.

A first aspect of the invention is a multi-output switching power supply which includes: a first switching element and a second switching element which are connected in series between output terminals of a DC power supply; a series resonant circuit which is connected in parallel with one of the first and second switching elements, and includes a current resonance capacitor, a resonant reactor and a primary winding of a transformer, which are connected in series; a first rectifying and smoothing circuit which rectifies and smoothes a voltage generated in a first secondary winding of the transformer, and outputs a first output; a second rectifying and smoothing circuit which has a first diode for rectifying a voltage generated in a second secondary winding of the transformer, a reactor having energy stored therein by the voltage rectified by the first diode in the second secondary winding and a second diode for regenerating the energy stored in the reactor into an output, and which rectifies a current flowing through the reactor and outputs a second output; and a control circuit which alternately turns on and off the first and second switching elements based on the first output obtained by the first rectifying and smoothing circuit.

A second aspect of the invention is a multi-output switching power supply which includes: a first switching element and a second switching element which are connected in series between output terminals of a DC power supply; a series resonant circuit which is connected in parallel with one of the first and second switching elements, and includes a current resonance capacitor, a resonant reactor and a primary winding of a transformer, which are connected in series; a first rectifying and smoothing circuit which rectifies and smoothes a voltage generated in a secondary winding of the transformer, and outputs a first output; a second rectifying and smoothing circuit which has a first diode for rectifying the voltage generated in the secondary winding of the transformer, a reactor having energy stored therein by the voltage rectified by the first diode in the secondary winding and a second diode for regenerating the energy stored in the reactor into an output, and which rectifies a current flowing through the reactor and outputs a second output; and a control circuit which alternately turns on and off the first and second switching elements based on the first output obtained by the first rectifying and smoothing circuit.

A third aspect of the invention is the multi-output switching power supply according to the first aspect of the invention, in which the voltage in the second secondary winding is applied to the reactor in an on period of the first switching element.

A fourth aspect of the invention is the multi-output switching power supply according to the first aspect of the invention, in which the voltage in the second secondary winding is applied to the reactor in an on period of the second switching element.

A fifth aspect of the invention is the multi-output switching power supply according to the second aspect of the invention, in which the voltage in the secondary winding is applied to the reactor in an on period of the first switching element.

A sixth aspect of the invention is the multi-output switching power supply according to the second aspect of the invention, in which the voltage in the secondary winding is applied to the reactor in an on period of the second switching element.

According to the present invention, a second output voltage different from a first output voltage can be easily retrieved by providing the second rectifying and smoothing circuit having the first diode, the second diode and the reactor between both ends of a secondary winding of a current resonant converter using a secondary-side half-wave rectification method in which duties of two switching elements are hardly changed with respect to a load change or between both ends of a second secondary winding wound with another winding.

By changing settings for the configuration of the second rectifying and smoothing circuit, the winding number ratio of the transformer T1, the exciting inductance Lp and the leakage inductance Lr between the primary winding P1 and the secondary winding S1, not only the first output voltage but also the second output voltage can be set more finely than a voltage determined by the winding number ratio. Moreover, even if a load of the first output is changed, duties of the first and second switching elements are not changed. Thus, when the first output voltage is stabilized, the second output voltage is hardly changed.

DESCRIPTION OF THE PREFERRED EMBODIMENT

Figure 1:
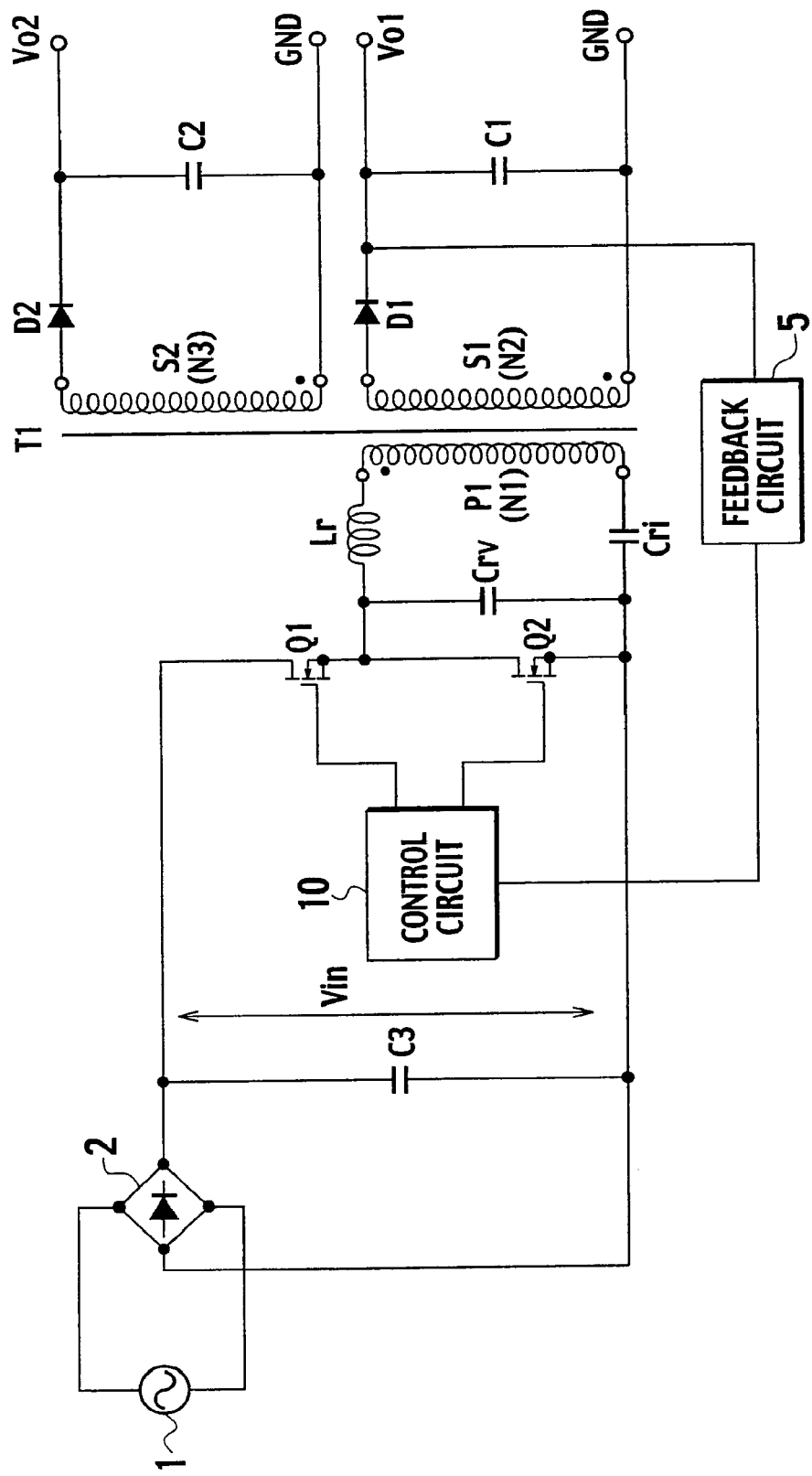
FIG. 1 is a circuit diagram showing a configuration of a conventional multi-output switching power supply.
Figure 2:
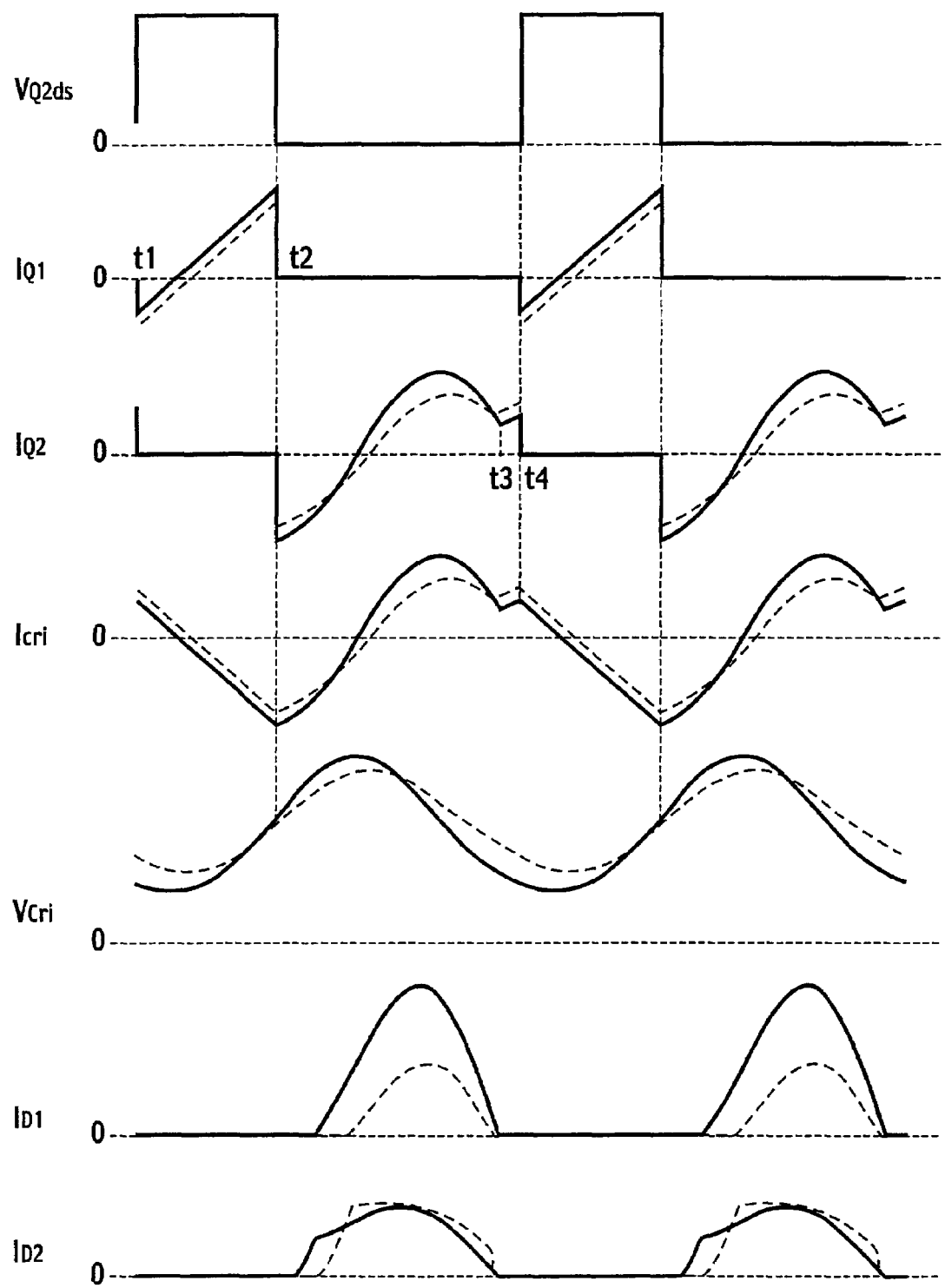
FIG. 2 is a waveform diagram showing operations of the conventional multi-output switching power supply.
Figure 3:
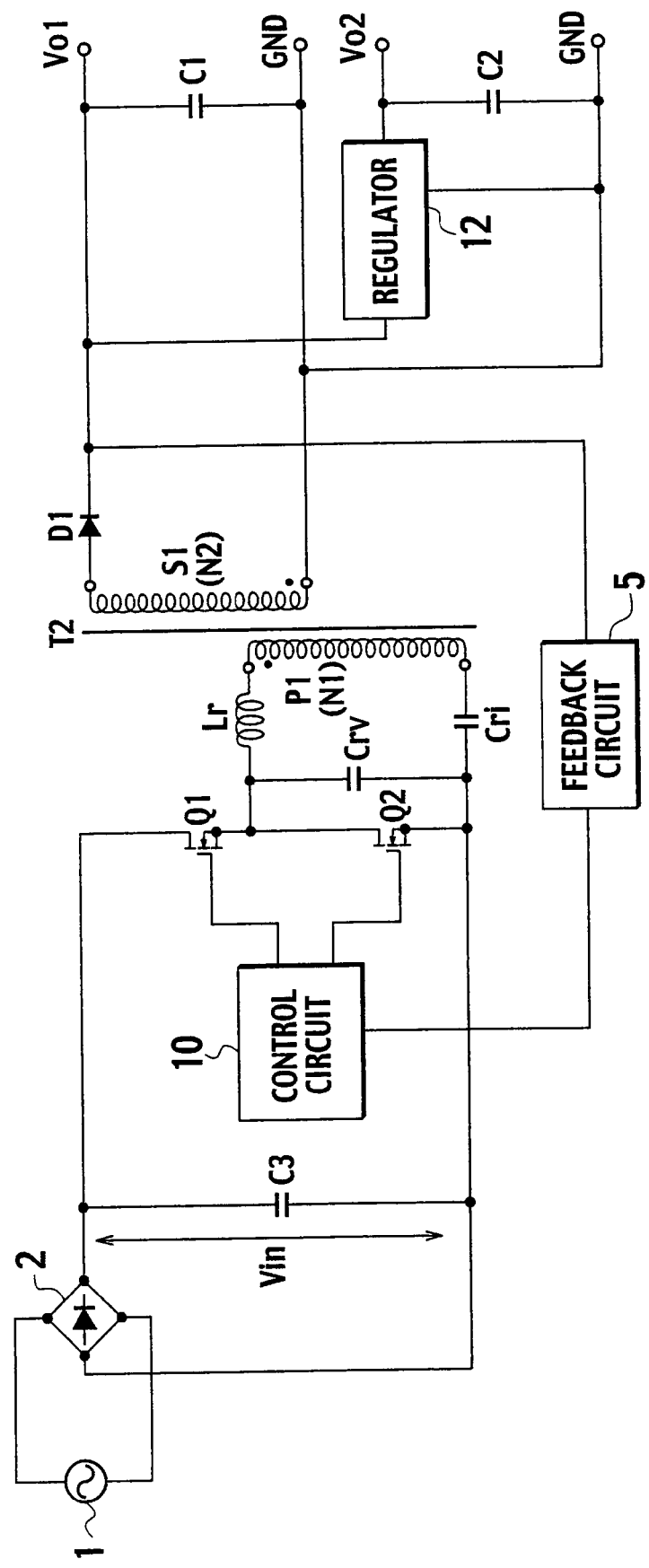
FIG. 3 is a circuit diagram showing a configuration of another conventional multi-output switching power supply.

With reference to the drawings, embodiments of a multi-output switching power supply of the present invention will be described in detail below. Note that the same constituent components as those of the multi-output switching power supply described in the section of the conventional technology or constituent components corresponding thereto are denoted by the same reference numerals as those used in the section of the conventional technology.

Embodiment 1

Figure 4:
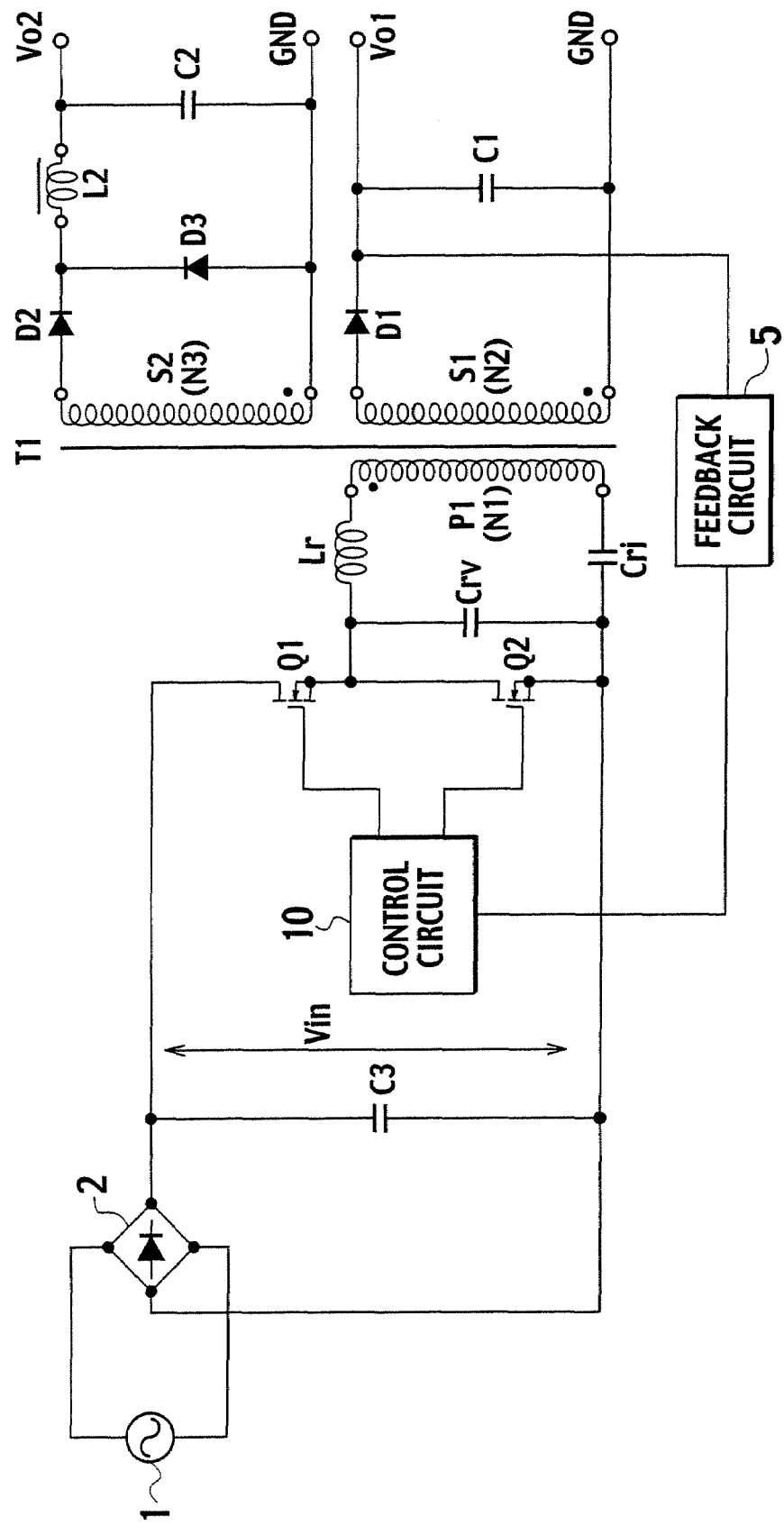
FIG. 4 is a circuit diagram showing a configuration of a multi-output switching power supply according to Embodiment 1 of the present invention.

FIG. 4 is a circuit diagram showing a configuration of a multi-output switching power supply according to Embodiment 1 of the present invention. The configuration of the multi-output switching power supply shown in FIG. 4 is different from that of the conventional multi-output switching power supply shown in FIG. 1 only in a constituent component connected to a second secondary winding S2 of a transformer T1. Thus, only a configuration of this component described above will be described.

An anode of a diode D2 is connected to one end of the second secondary winding S2 of the transformer T1, and an anode of a diode D3 is connected to the other end of the second secondary winding S2 of the transformer T1. A cathode of the diode D2 and a cathode of the diode D3 are connected to one end of a reactor L2, and the other end of the reactor L2 is connected to a second output terminal. A smoothing capacitor C2 is connected between the other end of the reactor L2 and the other end (a GND terminal) of the second secondary winding S2 and the anode of the diode D3.

The diode D2 rectifies a voltage generated in the second secondary winding S2 of the transformer T1. In the reactor L2, energy is stored by the voltage rectified by the diode D2 in the second secondary winding S2. The diode D3 regenerates the energy stored in the reactor L2 into the capacitor C2, which is an output. The above elements form a second rectifying and smoothing circuit. The second rectifying and smoothing circuit rectifies a current flowing through the reactor L2 to output the rectified current as a second output voltage Vo2 from the second output terminal.

Moreover, a control circuit 10 performs a PWM control so as to set a first output voltage Vo1 constant by alternately turning on and off a first switching element Q1 and a second switching element Q2 based on a first voltage error signal from a feedback circuit 5. In this case, as a control signal, such a voltage as to allow a dead time of about several hundred nS is applied to each of gates of the first and second switching elements Q1 and Q2. Thus, the first and second switching elements Q1 and Q2 are alternately turned on and off without allowing respective on periods of the first and second switching elements Q1 and Q2 to overlap with each other.

Next, with reference to a waveform diagram shown in FIG. 5, description will be given of operations of the multi-output switching power supply thus configured according to Embodiment 1 of the present invention.

Figure 5:
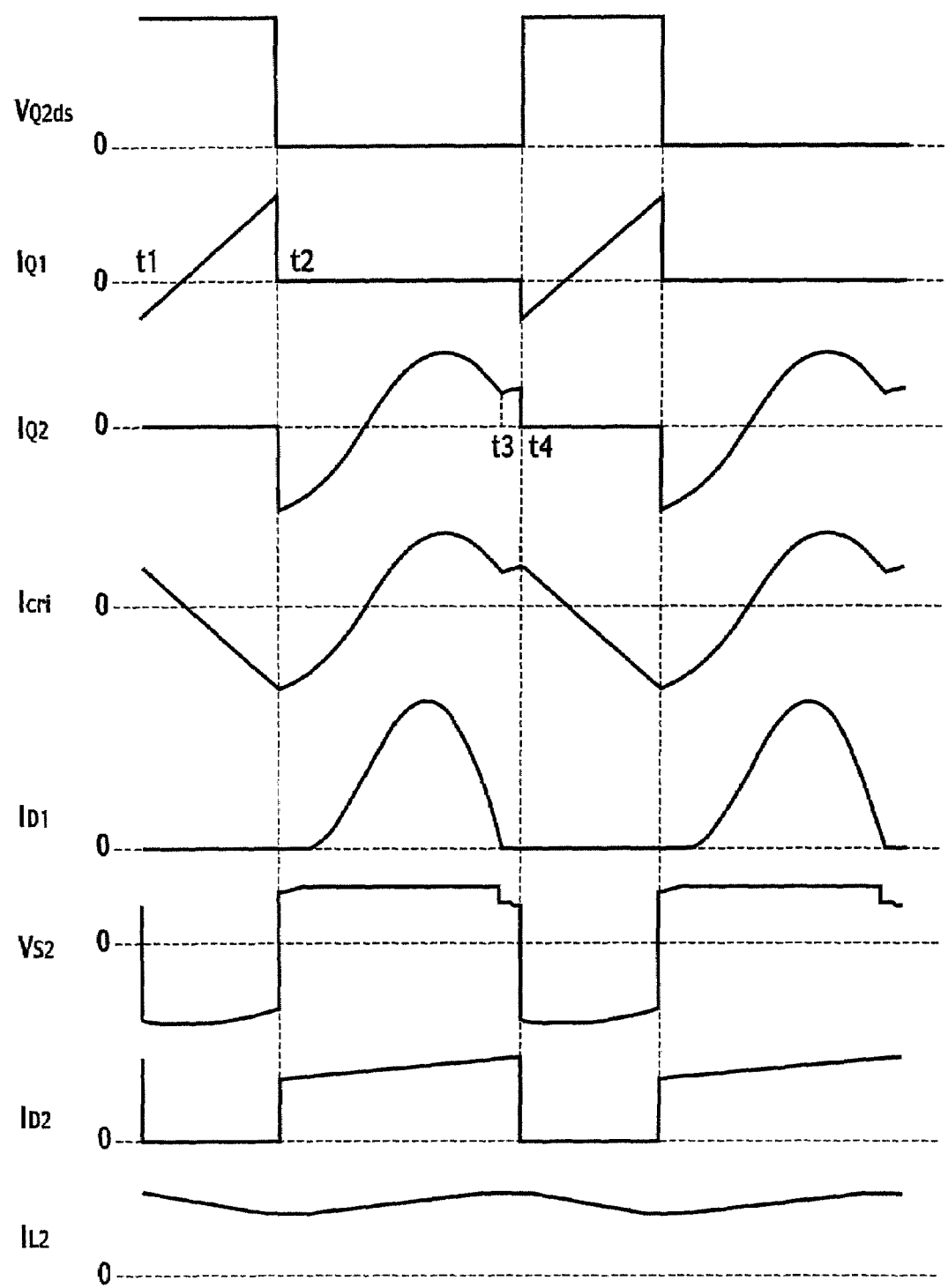
FIG. 5 is a waveform diagram showing operations of the multi-output switching power supply according to Embodiment 1 of the present invention.

In FIG. 5, $V_{Q2ds}$ is a voltage between a drain and a source of the second switching element Q2. $I_{Q1}$ is a current flowing through a drain of the first switching element Q1. $I_{Q2}$ is a current flowing through the drain of the second switching element Q2. $I_{cri}$ is a current flowing through a current resonance capacitor Cri. $V_{cri}$ is a voltage at both ends of the current resonance capacitor Cri. $I_{D1}$ is a current flowing through a diode D1. $V_{S2}$ is a voltage at both ends of the second secondary winding S2. $I_{D2}$ is a current flowing through the diode D2. $I_{L2}$ is a current flowing through the reactor L2.

As in the case of the conventional multi-output switching power supply, the first output voltage Vo1 is controlled by controlling duties of the first and second switching elements Q1 and Q2.

The second output voltage Vo2 is outputted in the following manner. Specifically, in the on period (for example, time t2 to t4) of the second switching element Q2, a voltage $V_{S2}=No1 \times N3/N2$ obtained by multiplying the first output voltage Vo1 by a winding number ratio is generated in the second secondary winding S2. This voltage $V_{S2}$ causes the current $I_{D2}$ and the current $I_{L2}$ to flow through S2, D2, L2, C2 and S2 in this order. Thus, energy is stored in the reactor L2, and, at the same time, the energy is transmitted to the output. Specifically, the energy is outputted as the second output voltage Vo2 from the second output terminal.

Next, in the on period (for example, time t1 to t2) of the first switching element Q1, the energy stored in the reactor L2 causes the current $I_{L2}$ to flow through L2, C2, D3 and L2 in this order. Specifically, the energy stored in the reactor L2 is outputted as the second output voltage Vo2 from the second output terminal through the diode D3.

A circuit configuration of the second output voltage Vo2 is the same as that of a general forward converter. Thus, in the case where an on-duty of the second switching element Q2 is Doff, the second output voltage Vo2 is set to Vo2=Vo1×(N3/N2)×Doff.

Moreover, the duties of the first and second switching elements Q1 and Q2 are not changed by a load change in a first output. Thus, in the case where an input voltage Vin is constant, when the first output voltage Vo1 is stabilized, the second output voltage Vo2 can also be stabilized at the same time. Moreover, the on-duty Don of the first and second switching elements Q1 and Q2 is determined approximately by Don=Vo1/Vin×Lr/Lp×N1/N2. Thus, by designing of the winding number ratio of the transformer T1, an exciting inductance Lp and a leakage inductance Lr between a primary winding P1 and a secondary winding S1, both of the first output voltage Vo1 and the second output voltage Vo2 can be determined.

Moreover, in the general forward converter, an output voltage Vo is set to Vo=Vin×D in a region where the current in the reactor L2 is DC superposed. However, at the time of a light load, the current in the reactor L2 is cut off, and the output voltage is stabilized by, for example, reducing an on duration of the first switching element Q1.

On the other hand, in Embodiment 1, the duties of the first and second switching elements Q1 and Q2 are not changed. Thus, when a load of the second output voltage Vo2 is reduced, the output voltage is inevitably increased. When an inductance of the reactor L2 is L and a switching frequency is f, the output voltage when the current in the reactor L2 is cut off is set to $(Vin^2 \times Doff^2)/2Lf$. Thus, a controllable output current range can be increased by increasing the inductance L of the reactor L2.

Moreover, the output voltage can be stabilized in the entire load region by adding a dummy resistance for consumption of the output power described above or by inserting an output uppercut dropper. In a normal dropper, (Vin×Vo)×Io is generated as a loss. Thus, the more the load current Io is increased, the more the loss is increased. In Embodiment 1, however, at the time of a heavy load, the dropper is set in a saturated state, and the loss is small. At the time of the light load, a loss of up to $(Vin^2 \times Doff^2)/2Lf$ in a no-load state is generated. Thus, the loss can be reduced by increasing the inductance of the reactor L2.

As described above, by use of the multi-output switching power supply according to Embodiment 1, the stable second output voltage Vo2 can be retrieved without newly adding a control circuit, by providing a step-down converter having the diode D2, the diode D3 and the reactor L2 between both ends of the second secondary winding S2 of a current resonant converter using a secondary-side half-wave rectification method in which the duties of the first and second switching elements Q1 and Q2 are hardly changed with respect to the load change such as the light load and the heavy load.

Embodiment 2

Figure 6:
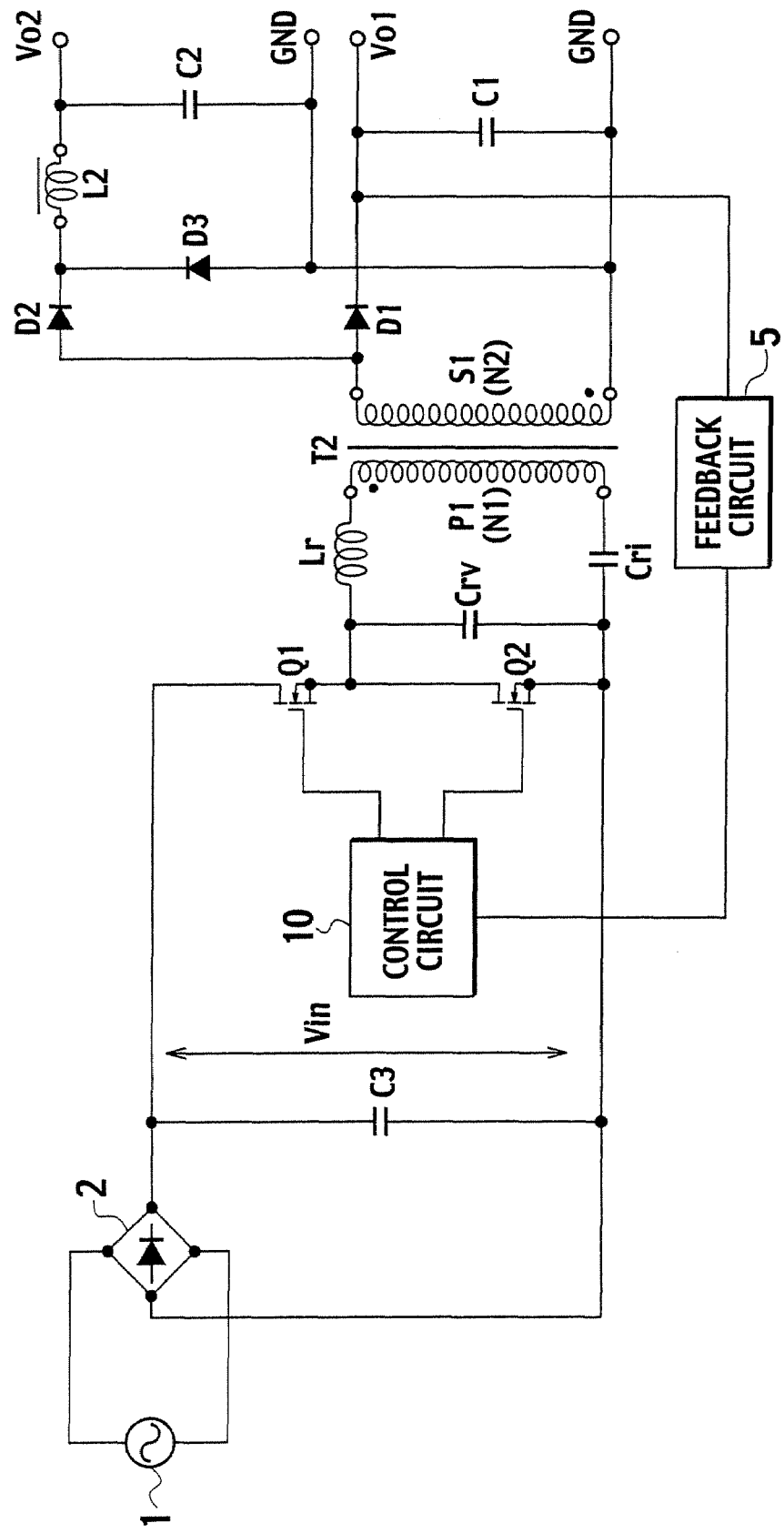
FIG. 6 is a circuit diagram showing a configuration of a multi-output switching power supply according to Embodiment 2 of the present invention.

FIG. 6 is a circuit diagram showing a configuration of a multi-output switching power supply according to Embodiment 2 of the present invention. The configuration of Embodiment 2 shown in FIG. 6 is different from that of Embodiment 1 shown in FIG. 4 in having a transformer T2 having a primary winding P1 and a secondary winding S1 and in the following point. Specifically, an anode of a diode D2 is connected to a connection point between the secondary winding S1 and an anode of a diode D1. Moreover, a GND terminal of a second output voltage Vo2 and an anode of a diode D3 are commonly connected to a GND terminal of a first output voltage Vo1.

By use of the multi-output switching power supply thus configured according to Embodiment 2, in an on period of a second switching element Q2, a voltage $V_{S1}$=Vo1+Vf (Vf is a forward voltage drop of the diode D1) is generated in the secondary winding S1. This voltage $V_{S1}$ causes a current $I_{D2}$ and a current $I_{L2}$ to flow through S1, D2, L2, C2 and S1 in this order. Thus, energy is stored in a reactor L2, and, at the same time, the energy is transmitted to an output. Specifically, the energy is outputted as the second output voltage Vo2 from a second output terminal.

Next, in an on period of a first switching element Q1, the energy stored in the reactor L2 causes a current $I_{L2}$ to flow through L2, C2, D3 and L2 in this order. Specifically, the energy stored in the reactor L2 is outputted as the second output voltage Vo2 from the second output terminal through the diode D3. In this case, assuming that forward voltage drops of the diodes D1 and D2 are approximately the same, the second output voltage can be designed to be Vo2=Vo1×Doff.

Embodiment 3

Figure 7:
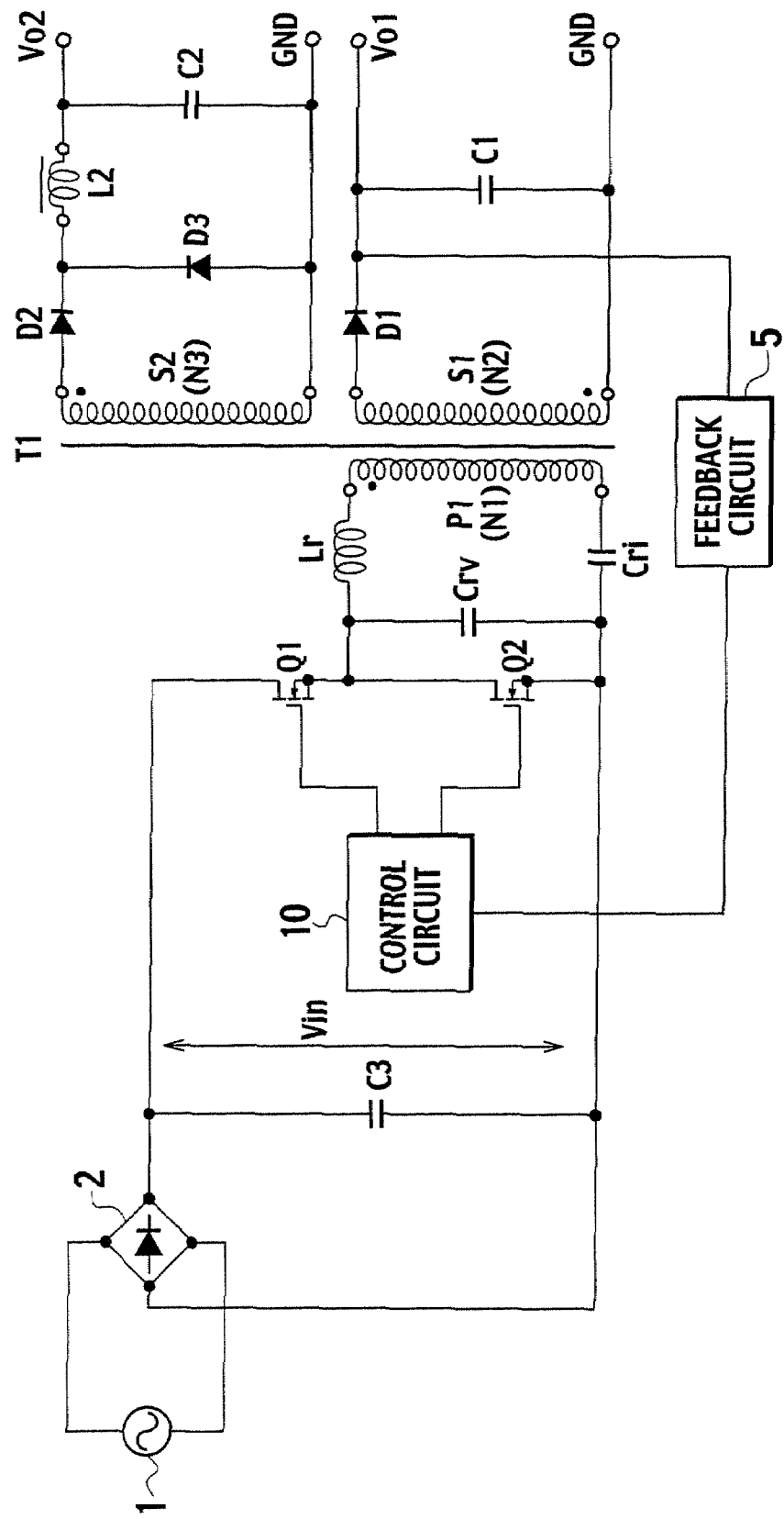
FIG. 7 is a circuit diagram showing a configuration of a multi-output switching power supply according to Embodiment 3 of the present invention.

FIG. 7 is a circuit diagram showing a configuration of a multi-output switching power supply according to Embodiment 3 of the present invention. The configuration of Embodiment 3 shown in FIG. 7 is different from that of Embodiment 1 shown in FIG. 4 in that a polarity of a second secondary winding S2 of a transformer T1 is inverted.

Figure 8:
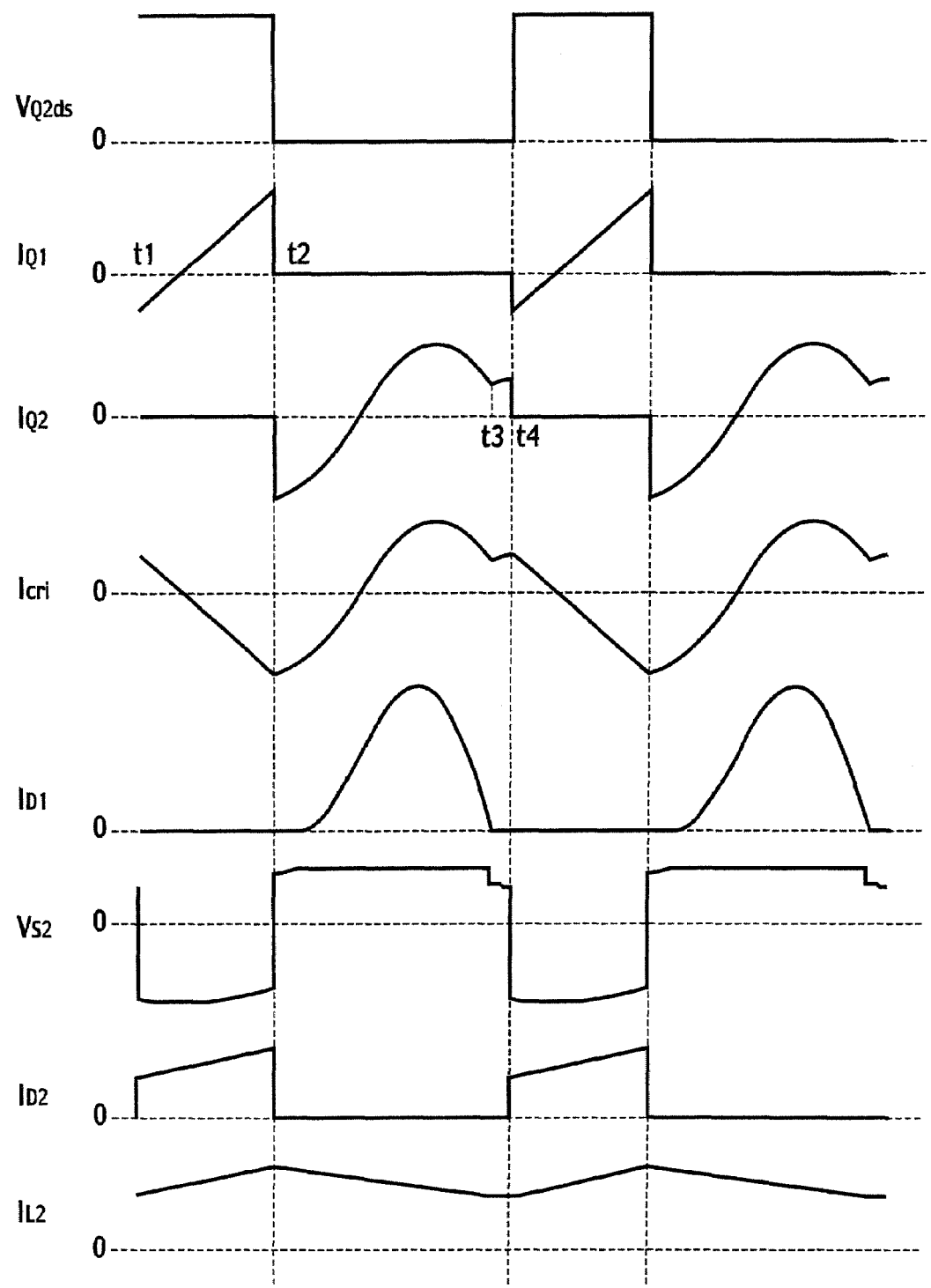
FIG. 8 is a waveform diagram showing operations of the multi-output switching power supply according to Embodiment 3 of the present invention.

Next, with reference to a waveform diagram shown in FIG. 8, description will be given of operations of the multi-output switching power supply thus configured according to Embodiment 3 of the present invention.

In an on period of a second switching element Q2, a voltage of Vn2off=Vo1+Vf is generated in a secondary winding S1 only for a period of toff=Doff/f. Since voltage time products of positive and negative voltages generated in the secondary winding S1 of the transformer T1 are equal, a voltage of Vn2on=Vn2off×toff/ton is generated in the secondary winding S1 in an on period ton of a first switching element Q1.

In the on period (for example, time t1 to t2) of the first switching element Q1, a voltage $V_{S2}$=Vn2on×N3/N2 is generated in the second secondary winding S2. This voltage $V_{S2}$ causes a current $I_{D2}$ and a current $I_{L2}$ to flow through S2, D2, L2, C2 and S2 in this order. Thus, energy is stored in a reactor L2, and, at the same time, the energy is transmitted to an output. Specifically, the energy is outputted as a second output voltage Vo2 from a second output terminal.

Next, in the on period (for example, time t2 to t4) of the second switching element Q2, the energy stored in the reactor L2 causes a current $I_{L2}$ to flow through L2, C2, D3 and L2 in this order. Specifically, the energy stored in the reactor L2 is outputted as the second output voltage Vo2 from the second output terminal through a diode D3.

In this case, assuming that forward voltage drops of diodes D1 and D2 are approximately the same, the second output voltage can be designed to be Vo2=Vn2on×N3/N2×Don=Vo1×N3/N2×Doff.

Embodiment 4

Figure 9:
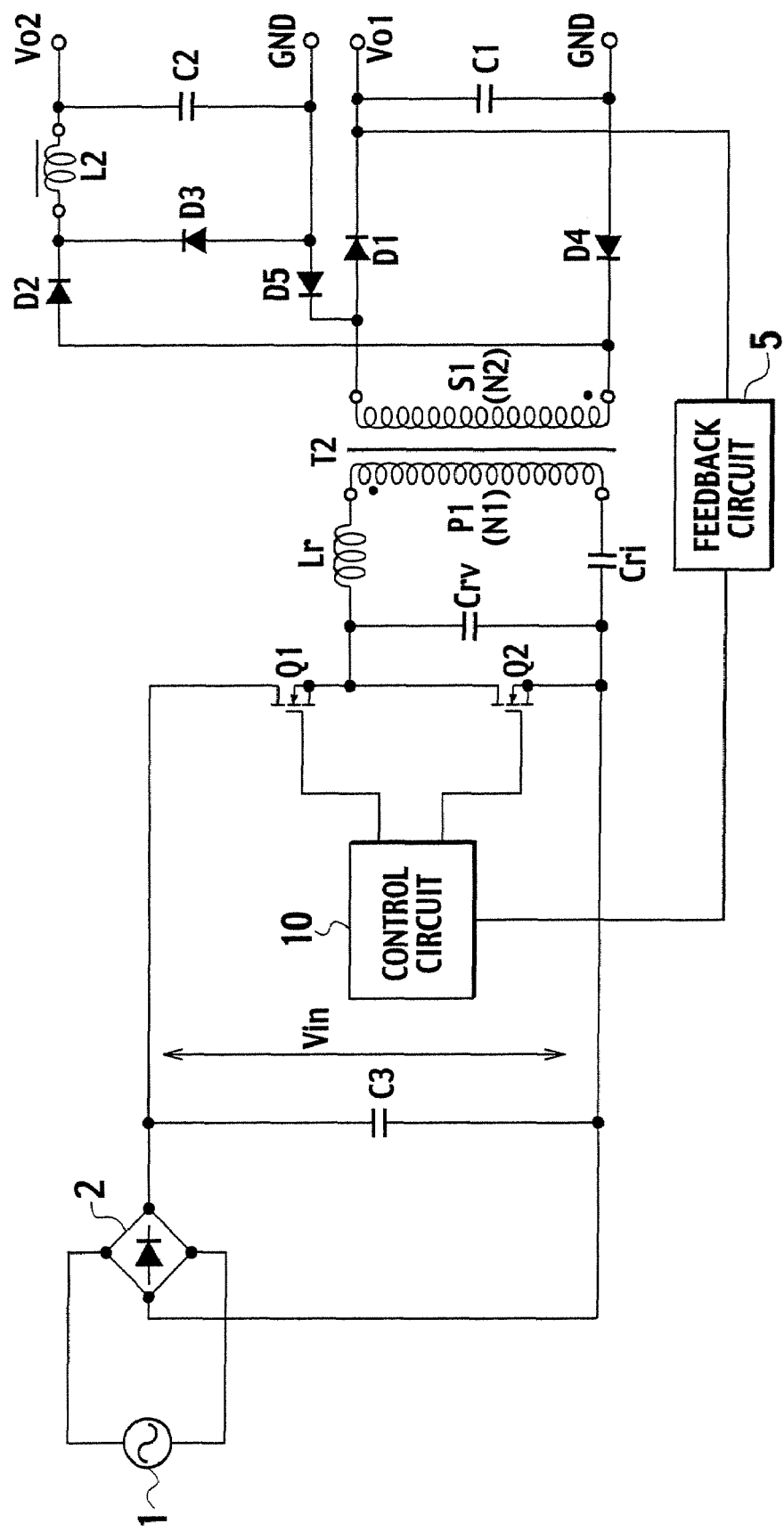
FIG. 9 is a circuit diagram showing a configuration of a multi-output switching power supply according to Embodiment 4 of the present invention.

FIG. 9 is a circuit diagram showing a configuration of a multi-output switching power supply according to Embodiment 4 of the present invention. The configuration of Embodiment 4 shown in FIG. 9 is different from that of Embodiment 1 shown in FIG. 4 in having a transformer T2 having a primary winding P1 and a secondary winding S1 and in the following point. Specifically, one end of the secondary winding S1 of the transformer T2 is connected to a cathode of a diode D4, and an anode of the diode D4 is connected to one end of a capacitor C1 and a GND terminal of a first output terminal.

An anode of a diode D2 is connected to a connection point between the one end of the secondary winding S1 and the diode D4. An anode of a diode D5 is connected to a GND terminal of a second output voltage Vo2, and a cathode of the diode D5 is connected to a connection point between the other end of the secondary winding S1 and an anode of a diode D1.

By use of the multi-output switching power supply thus configured according to Embodiment 4, in an on period of a first switching element Q1, a voltage of Vn2on=(Vo+2Vf)×toff/ton is generated in the secondary winding S1. This voltage causes a current $I_{D2}$ and a current $I_{L2}$ to flow through S1, D2, L2, C2, D5 and S1 in this order. Thus, energy is stored in a reactor L2, and, at the same time, the energy is transmitted to an output. Specifically, the energy is outputted as the second output voltage Vo2 from a second output terminal.

Next, in an on period of a first switching element Q1, the energy stored in the reactor L2 causes a current $I_{L2}$ to flow through L2, C2, D3 and L2 in this order. Specifically, the energy stored in the reactor L2 is outputted as the second output voltage Vo2 from the second output terminal through the diode D3. In this case, assuming that forward voltage drops of the diodes D1 to D4 are approximately the same, the second output voltage can be designed to be Vo2=Vo1×Doff.

Embodiment 5

Figure 10:
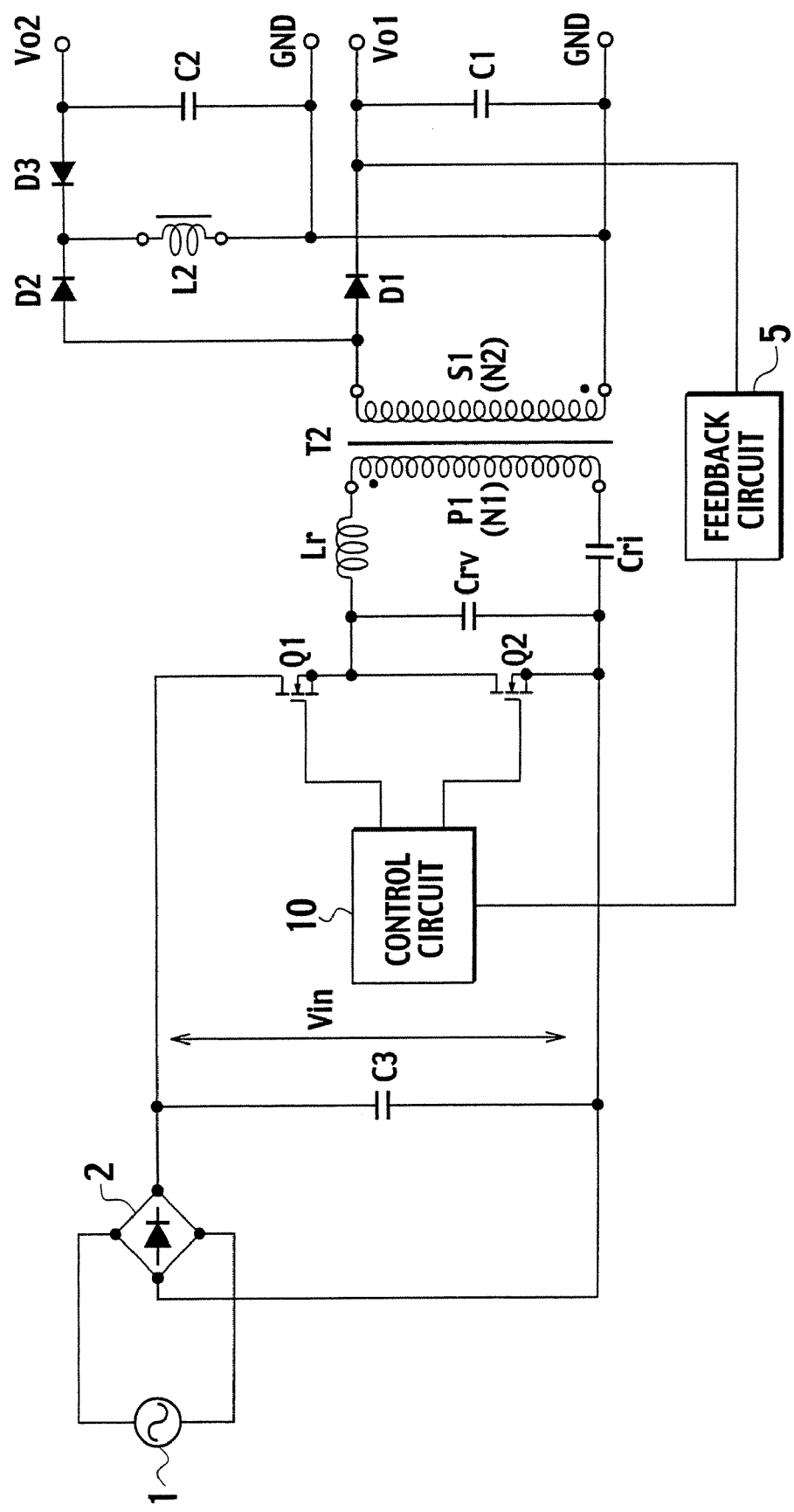
FIG. 10 is a circuit diagram showing a configuration of a multi-output switching power supply according to Embodiment 5 of the present invention.

FIG. 10 is a circuit diagram showing a configuration of a multi-output switching power supply according to Embodiment 5 of the present invention. The configuration of Embodiment 5 shown in FIG. 10 is different from that of Embodiment 1 shown in FIG. 4 in having a transformer T2 having a primary winding P1 and a secondary winding S1 and in the following point.

Specifically, an anode of a diode D2 is connected to a connection point between one end of the secondary winding S1 of the transformer T2 and an anode of a diode D1. Between a cathode of the diode D2 and a GND terminal, a reactor L2 is connected. Moreover, a cathode of a diode D3 is connected to a connection point between the reactor L2 and the cathode of the diode D2. Between an anode of the diode D3 and a GND terminal, one end of a capacitor C2 is connected. From both ends of the capacitor C2, a second output voltage Vo2 is outputted.

By use of the multi-output switching power supply thus configured according to Embodiment 5, in an on period of a second switching element Q2, a voltage of Vn2off=Vo+Vf is generated in the secondary winding S1 of the transformer T2. This voltage causes a current $I_{D2}$ and a current $I_{L2}$ to flow through S1, D2, L2 and S1 in this order. Thus, energy is stored in the reactor L2.

Next, in an on period of a first switching element Q1, the voltage applied to the reactor L2 is inverted, and the energy stored in the reactor L2 causes a current $I_{L2}$ to flow through L2, C2, D3 and L2 in this order. Specifically, the energy stored in the reactor L2 is outputted as the second output voltage Vo2 from a second output terminal through the diode D3.

A circuit configuration of the second output voltage Vo2 is the same as that of an inverting converter. Thus, in the case where, the on period of the first switching element Q1 is ton and the on period of the second switching element Q2 is toff, the second output voltage Vo2 can be designed to be nearly equal to −Vo1×toff/ton in a region where the current in the reactor L2 is DC superposed.

Embodiment 6

Figure 11:
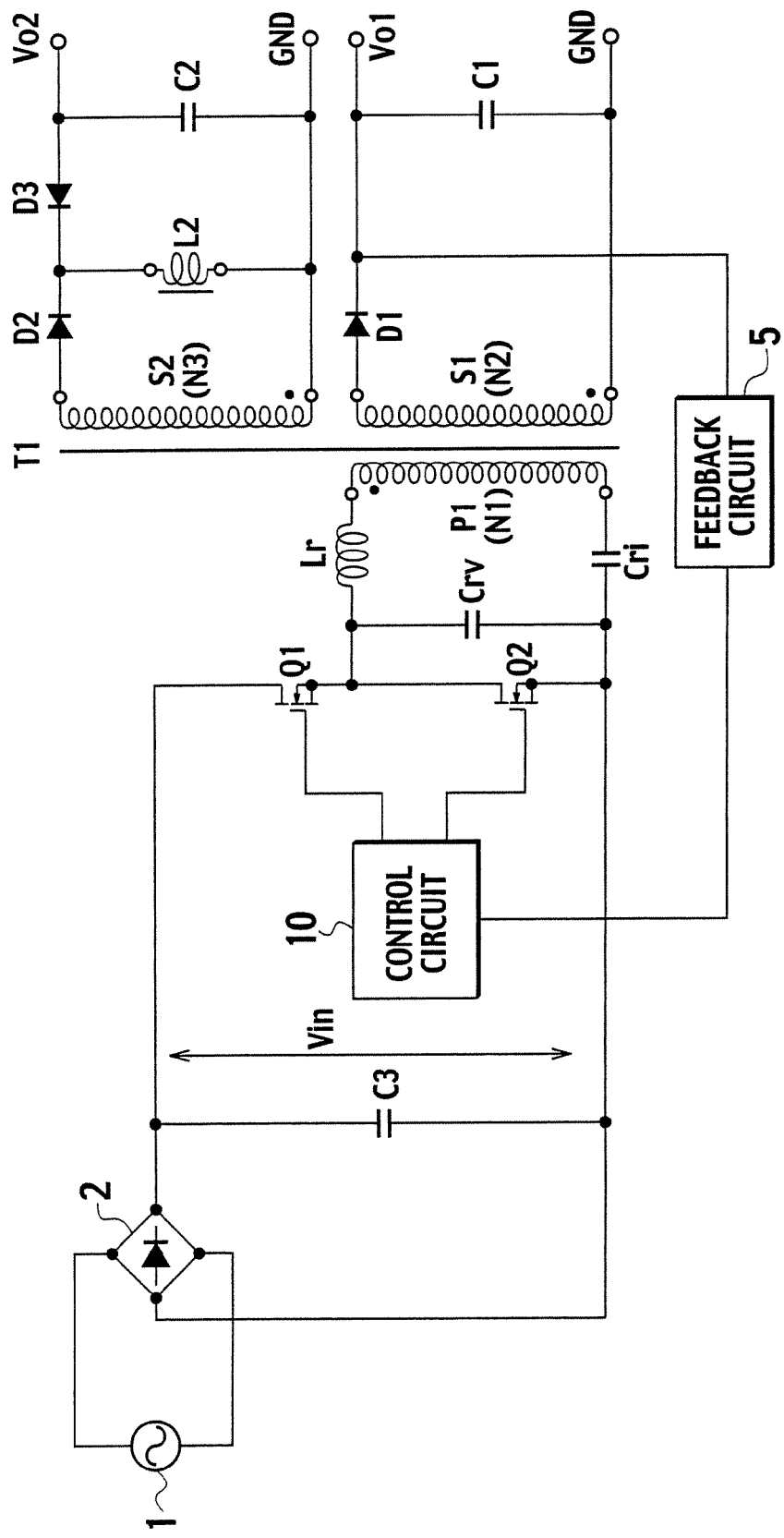
FIG. 11 is a circuit diagram showing a configuration of a multi-output switching power supply according to Embodiment 6 of the present invention.

FIG. 11 is a circuit diagram showing a configuration of a multi-output switching power supply according to Embodiment 6 of the present invention. The configuration of Embodiment 6 shown in FIG. 11 is different from that of Embodiment 5 shown in FIG. 10 in having a transformer T1 including a second secondary winding S2 in addition to a primary winding P1 and a first secondary winding S1, and in the following point. Specifically, a series circuit including a diode D2 and a reactor L2, which has been connected to both ends of the first secondary winding S1, is connected to both ends of the second secondary winding S2.

By use of the multi-output switching power supply thus configured according to Embodiment 6, in an on period of a second switching element Q2, a voltage of (Vo1+Vf)/(N3/N2) is generated in the second secondary winding S2 of the transformer T1. This voltage causes a current $I_{D2}$ and a current $I_{L2}$ to flow through S2, D2, L2 and S2 in this order. Thus, energy is stored in the reactor L2.

Next, in an on period of a first switching element Q1, the voltage applied to the reactor L2 is inverted, and the energy stored in the reactor L2 causes a current $I_{L2}$ to flow through L2, C2, D3 and L2 in this order. Specifically, the energy stored in the reactor L2 is outputted as a second output voltage Vo2 from a second output terminal through a diode D3.

A circuit configuration of the second output voltage Vo2 is the same as that of an inverting converter. Thus, in the case where, the on period of the first switching element Q1 is ton and the on period of the second switching element Q2 is toff, the second output voltage Vo2 can be designed to be nearly equal to −Vo1×N3/N2×toff/ton in a region where the current in the reactor L2 is DC superposed.

Embodiment 7

Figure 12:
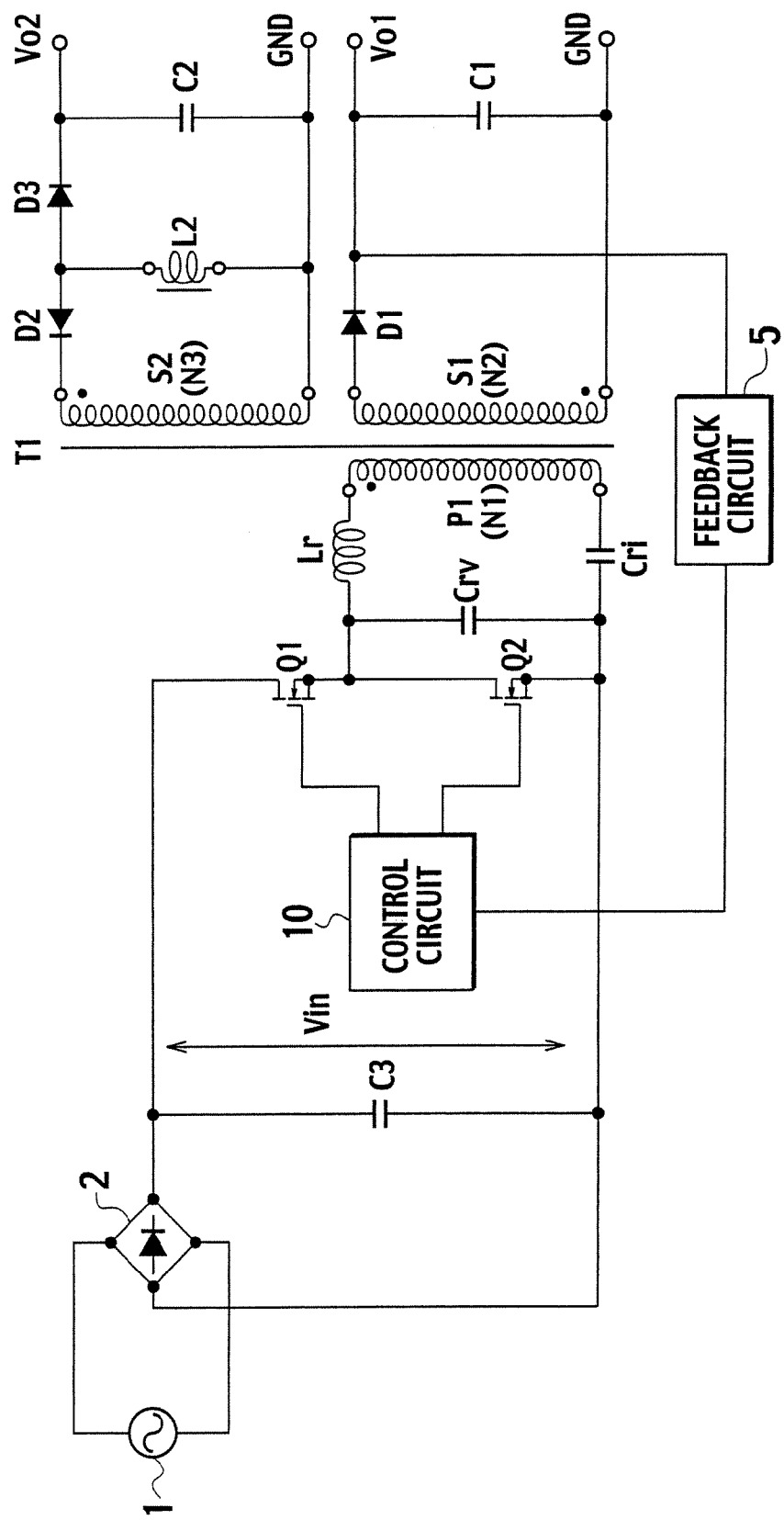
FIG. 12 is a circuit diagram showing a configuration of a multi-output switching power supply according to Embodiment 7 of the present invention.

FIG. 12 is a circuit diagram showing a configuration of a multi-output switching power supply according to Embodiment 7 of the present invention. The multi-output switching power supplies of Embodiments 5 and 6 shown in FIGS. 10 and 11, respectively, can retrieve only a negative second output voltage Vo2. Meanwhile, the multi-output switching power supply of Embodiment 7 shown in FIG. 12 can retrieve a positive second output voltage Vo2.

Thus, the configuration of Embodiment 7 shown in FIG. 12 is different from that of Embodiment 6 shown in FIG. 11 in that polarities of a second secondary winding S2 and diodes D2 and D3 are inverted, respectively.

By use of the multi-output switching power supply thus configured according to Embodiment 7, in an on period of a second switching element Q2, a voltage is generated in the second secondary winding S2 of the transformer T1. This voltage causes a current $I_{D2}$ and a current $I_{L2}$ to flow through S2, L2, D2 and S2 in this order. Thus, energy is stored in the reactor L2.

Next, in an on period of a first switching element Q1, the voltage applied to the reactor L2 is inverted, and the energy stored in the reactor L2 causes a current $I_{L2}$ to flow through L2, D3, C2 and L2 in this order. Specifically, the energy stored in the reactor L2 is outputted as the positive second output voltage Vo2 from a second output terminal through the diode D3.

The multi-output switching power supply according to the present invention can be utilized as a power supply which outputs a plurality of DC voltages having different voltage values.

What is claimed is:

1. A multi-output switching power supply comprising:
    a first switching element and a second switching element which are connected in series between output terminals of a DC power supply;
    a series resonant circuit which is connected in parallel with one of the first and second switching elements, and includes a current resonance capacitor, a resonant reactor and a primary winding of a transformer, which are connected in series;
    a first rectifying and smoothing circuit which rectifies and smoothes a voltage generated in a secondary winding of the transformer, and thus outputs a first output;
    a second rectifying and smoothing circuit which has a first diode for rectifying the voltage generated in the secondary winding of the transformer, one end of the first diode is connected to one end of the secondary winding of the transformer, a reactor having energy stored therein by the voltage rectified by the first diode in the secondary winding, one end of the reactor is connected to other end of the first diode, other end of the reactor is connected to other end of the secondary winding of the transformer and one end of a first output terminal, and a second diode for regenerating the energy stored in the reactor into an output, one end of the second diode is connected to the other end of the first diode and the one end of the reactor, other end of the second diode is connected to other end of the first output terminal, and which rectifies a current flowing through the reactor and outputs a second output to the one end and the other end of the first output terminal; and
    a control circuit which alternately turns on and off the first and second switching elements based on the first output obtained by the first rectifying and smoothing circuit.

2. The multi-output switching power supply according to claim 1, wherein the voltage in the secondary winding is applied to the reactor in an on period of the first switching element.

3. The multi-output switching power supply according to claim 1, wherein the voltage in the secondary winding is applied to the reactor in an on period of the second switching element.

4. A multi-output switching power supply comprising:
    a first switching element and a second switching element which are connected in series between output terminals of a DC power supply;
    a series resonant circuit which is connected in parallel with one of the first and second switching elements, and includes a current resonance capacitor, a resonant reactor and a primary winding of a transformer, which are connected in series;
    a first rectifying and smoothing circuit which rectifies and smoothes a voltage generated in a first secondary winding of the transformer, and thus outputs a first output;
    a second rectifying and smoothing circuit which has a first diode for rectifying a voltage generated in a second secondary winding of the transformer, one end of the first diode is connected to one end of the second secondary winding of the transformer, a reactor having energy stored therein by the voltage rectified by the first diode in the second secondary winding, one end of the reactor is connected to other end of the first diode, other end of the reactor is connected to other end of the second secondary winding of the transformer and one end of a first output terminal, and a second diode for regenerating the energy stored in the reactor into an output, one end of the second diode is connected to the other end of the first diode and the one end of the reactor, other end of the second diode is connected to other end of the first output terminal, and which rectifies a current flowing through the reactor and outputs a second output to the one end and the other end of the first output terminal; and
    a control circuit which alternately turns on and off the first and second switching elements based on the first output obtained by the first rectifying and smoothing circuit.

5. The multi-output switching power supply according to claim 4, wherein the voltage in the second secondary winding is applied to the reactor in an on period of the first switching element.

6. The multi-output switching power supply according to claim 4, wherein the voltage in the second secondary winding is applied to the reactor in an on period of the second switching element.

* * * * *